United States Patent
Nishikata et al.

(10) Patent No.: US 11,435,685 B2
(45) Date of Patent: Sep. 6, 2022

(54) IMAGE FORMING APPARATUS

(71) Applicant: CANON KABUSHIKI KAISHA, Tokyo (JP)

(72) Inventors: Akinobu Nishikata, Tokyo (JP); Takashi Yokoya, Tokyo (JP); Toshifumi Oikawa, Tokyo (JP); Yutaka Ando, Tokyo (JP); Koji Yumoto, Tokyo (JP); Riki Fukuhara, Tokyo (JP); Yuichiro Oda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/318,282

(22) Filed: May 12, 2021

(65) Prior Publication Data
US 2021/0356894 A1  Nov. 18, 2021

(30) Foreign Application Priority Data
May 18, 2020 (JP) .............................. JP2020-086455

(51) Int. Cl.
*G03G 15/23* (2006.01)
*G03G 15/00* (2006.01)

(52) U.S. Cl.
CPC ....... *G03G 15/5062* (2013.01); *G03G 15/234* (2013.01); *G03G 15/6558* (2013.01)

(58) Field of Classification Search
None
See application file for complete search history.

(56) References Cited

U.S. PATENT DOCUMENTS

| | | | |
|---|---|---|---|
| 7,760,370 B2 | 7/2010 | Oki | |
| 2003/0175602 A1* | 9/2003 | Kazama | H04N 1/00031 430/30 |
| 2016/0219172 A1* | 7/2016 | Mita | H04N 1/00713 |
| 2017/0142285 A1* | 5/2017 | Miyagi | H04N 1/3873 |

* cited by examiner

*Primary Examiner* — Sevan A Aydin
(74) *Attorney, Agent, or Firm* — Rossi, Kimms & McDowell LLP

(57) ABSTRACT

An image forming apparatus includes an image forming unit configured to perform a first image forming process and a second image forming process to form an image and a test image on a sheet; a reader, arranged in a conveyance path along which the sheet is conveyed, configured to read the test image on the sheet, the test image being formed by the image forming unit; a member; a controller configured to obtain, from the reader, reading data related to the test image on the sheet.

6 Claims, 12 Drawing Sheets

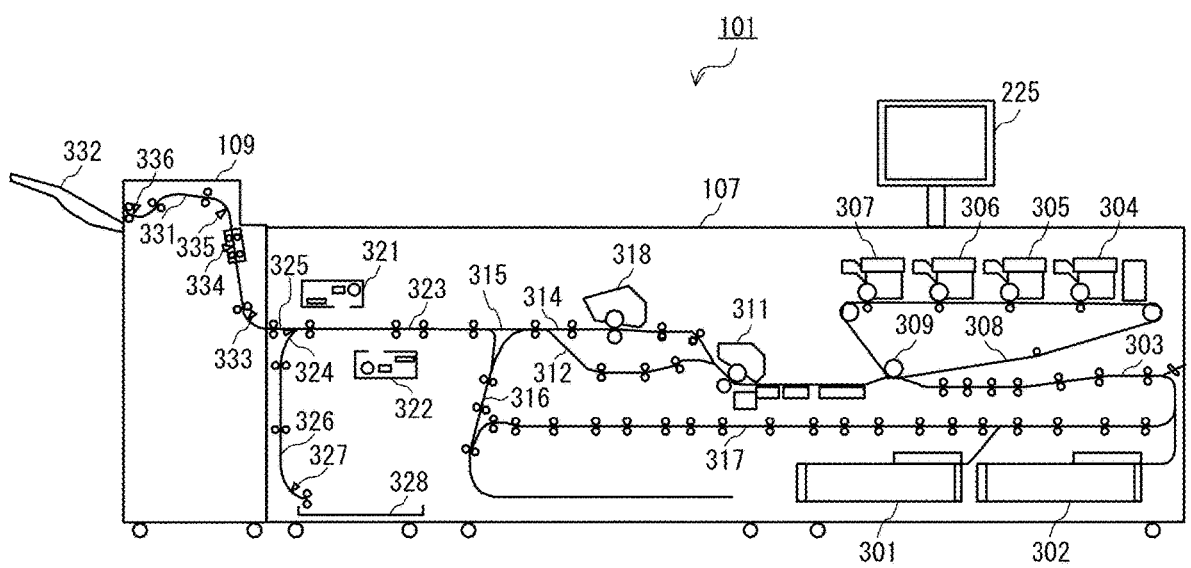
FIG. 4
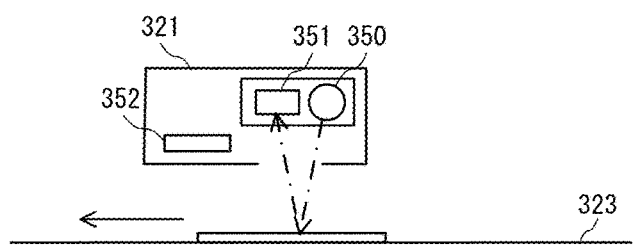
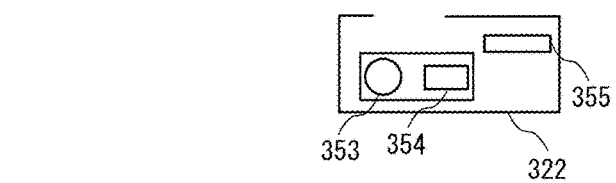
FIG. 5

| PAGE ID |
|---|
| SHEET WIDTH [mm] |
| SHEET LENGTH [mm] |
| BASIS WEIGHT [gsm] |
| SHEET TYPE |
| SHEET FEEDING DECK ID |
| ADJUSTMENT CHART INFORMATION |
| IMAGE FORMING CONDITION ID |
| ... |

FIG. 8A

| IMAGE FORMING CONDITION ID |
|---|
| IMAGE PARAMETER 1 |
| IMAGE PARAMETER 2 |
| IMAGE PARAMETER 3 |
| IMAGE PARAMETER 4 |
| ... |

IMAGE FORMING CONDITION

FIG. 8B

| FIRST SHEET FEEDING DECK |
|---|
| TRANSMISSION FLAG 11 |
| IMAGE FORMING CONDITION PACKET 11 |
| TRANSMISSION FLAG 12 |
| IMAGE FORMING CONDITION PACKET 12 |
| ... |
| SECONDD SHEET FEEDING DECK |
| TRANSMISSION FLAG 21 |
| IMAGE FORMING CONDITION PACKET 21 |
| TRANSMISSION FLAG 22 |
| IMAGE FORMING CONDITION PACKET 22 |
| ... |

FIG. 8C

| SHEET TYPE A |
|---|
| TRANSMISSION FLAG A1 |
| IMAGE FORMING CONDITION PACKET A1 |
| TRANSMISSION FLAG A2 |
| IMAGE FORMING CONDITION PACKET A2 |
| ... |
| SHEET TYPE B1 |
| TRANSMISSION FLAG B1 |
| IMAGE FORMING CONDITION PACKET B1 |
| TRNSMISSION FLAG B2 |
| IMAGE FORMING CONDITION PACKET B2 |
| ... |

FIG. 8D

IMAGE FORMING APPARATUS

BACKGROUND OF THE INVENTION

Field of the Invention

The present invention relates to an image forming apparatus, such as a printer, a copying machine, a facsimile, and a multifunction apparatus.

Description of the Related Art

As to printed matters printed by a commercial printing machine, it is desirable to stabilize printing position accuracy for both a back surface and front surface. In U.S. Pat. No. 7,760,370 B2 discloses an image forming apparatus which stabilizes the printing position accuracy. In the image forming apparatus, in order to stabilize the print position accuracy, an adjustment image, which serves as a mark of a print position (a position at which an image is formed) is printed on a sheet to create the adjustment chart. The adjustment image on the adjustment chart is read by an image reading sensor provided in a sheet conveyance path. The image forming apparatus adjusts a print position by feeding back a reading result of the adjustment image to an image forming condition.

During a period in which the adjustment chart to adjust a printing position, productivity is decreased since it is not possible to generate the printed matter according to instructions of a user. Therefore, a technology is proposed in which an adjustment image is printed on a sheet according to an instruction of a user to adjust a printing position. In this method, the print position is adjusted in real time while generating the printed matter according to the instruction of the user.

The image forming apparatus may be equipped with a plurality of control units, each corresponds to respective control units. In this case, an image forming condition is sequentially notified to each control unit. Therefore, the image forming condition which has been adjusted is reflected in each control unit at each timing. Therefore, the control units may operate in the image forming conditions which are different from each other even for images on the same page. This causes decreased quality of the printed matter. For example, when a second image forming condition is notified, during operation in a first image forming condition, at a predetermined timing, the second image forming condition is reflected in different pages in each control unit. Therefore, images are printed on the same page with different image forming conditions. In view of the above, one object of the present invention is to provide an image forming apparatus which prevents images from being printed on the same page in the different image forming conditions.

SUMMARY OF THE INVENTION

The image forming apparatus according to the present disclosure includes: an image forming unit configured to perform a first image forming process and a second image forming process to form an image and a test image on a sheet; a reader, arranged in a conveyance path along which the sheet is conveyed, configured to read a test image on the sheet, the test image being formed by the image forming unit; a memory; a controller configured to: obtain, from the reader, reading data related to the test image on the sheet; generate, the reading data, an image forming condition for the first image forming process and an image forming condition for the second image forming process; and store the image forming condition for the first image forming process and the image forming condition for the second image forming process, wherein the controller generates a third image forming condition for the first image forming process and a fourth image forming condition for the second image forming process based on reading data related to test image formed by performing the first image forming process based on the first image forming condition and the second image forming process based on the second image forming condition, wherein, in a case where the image forming unit performs the first image forming process based on a first image forming condition to form a N-th image on a N-th sheet, the image forming unit performs the second image forming process based on a second image forming condition even if a third image forming condition for the first image forming process and a fourth image forming condition for the second image forming process are stored in the memory wherein, in a case where a (N+1)-th image is formed on a (N+1)-th sheet, the image forming unit performs the first image forming process based on the third image forming condition and the second image forming process based on the fourth image forming condition.

Further features of the present invention will become apparent from the following description of exemplary embodiments (with reference to the attached drawings).

BRIEF DESCRIPTION OF THE DRAWINGS

FIG. 4 is a configuration diagram of an image forming apparatus.

FIG. 5 is an explanatory diagram of a CIS.

FIG. 8A to FIG. 8D are explanatory diagrams of various information used for a printing process.

DESCRIPTION OF THE EMBODIMENTS

At least one embodiment of the present disclosure is described below in detail with reference to the drawings.
<Image Forming System>

Figure 1:
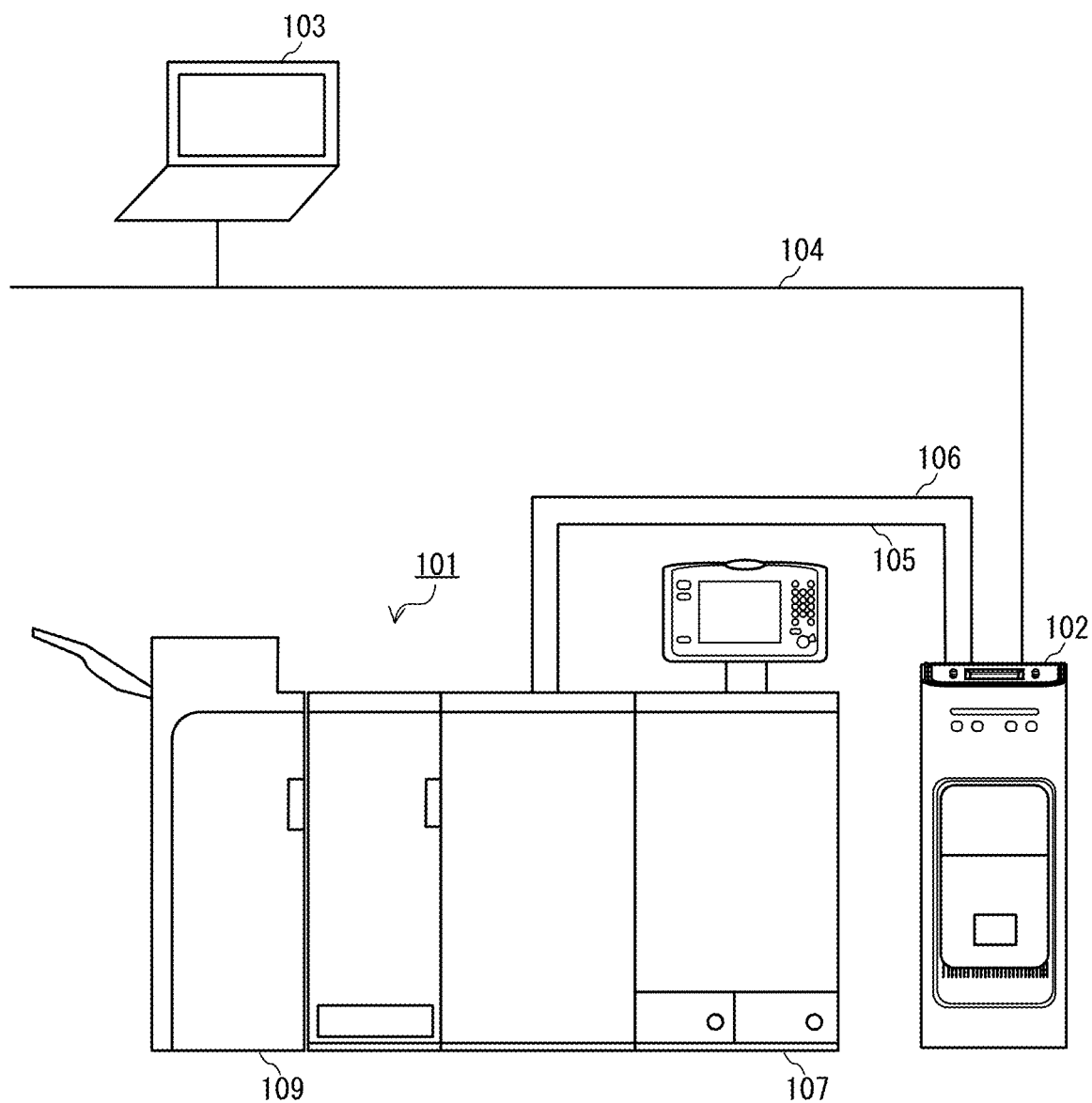
FIG. 1 is a configuration diagram of an image processing system.

FIG. 1 is a configuration diagram of an image processing system including an image forming apparatus of the present embodiment. The image processing system is equipped with an image forming apparatus 101 and an external controller 102. The image forming apparatus 101 is a multifunction apparatus, a multi-function peripheral (MFP) or the like, for example. The external controller 102 is an image processing controller, a digital front end (DFE), a print server, or the like, for example.

The image forming apparatus 101 and the external controller 102 are communicably connected via an internal LAN (Local Area Network) 105 and a video cable 106. The external controller 102 is connected to a client PC (Personal Computer) 103 via an external LAN 104. The external controller 102 obtains print instruction (print job) from the client PC 103. The print job includes image data representing an image formed on a sheet and page information corresponding to the image data.

A printer driver, having a function of converting print data into a print description language which can be processed by the external controller 102, is installed in the client PC 103. A user can issue an instruction for printing from various applications via the printer driver. The printer driver transmits print data to the external controller 102 based on a print instruction from the user. The external controller 102 receives a print instruction including print data from the client PC 103. The external controller 102 performs data analysis and rasterization processing on the received print instruction and instructs the image forming apparatus 101 to print (image forming) of an image based on the print data.

The image forming apparatus 101 is configured by connecting a plurality of devices, each having different functions, including a punting apparatus 107. Further, the image forming apparatus 101 can perform a complicated punting process such as bookbinding. The image forming apparatus 101 of the present embodiment includes a printing apparatus 107 and a finisher 109. The printing apparatus 107 uses a developing agent (for example, toner) to form an image on the sheet fed from a sheet feeding unit provided in a lower part of a main body. The printing apparatus 107 forms a yellow (Y), magenta (M), cyan (C), and black (K) image. On the sheet, a full-color image in which images of each color are superimposed is formed. The sheet on which the image is formed is conveyed from the printing apparatus 107 to the finisher 109. The finisher 109 loads the sheet on which the image is formed.

In the configuration of the image processing system of the present embodiment, the external controller 102 is connected to the image forming apparatus 101, however, the external controller 102 may be omitted. The image forming apparatus 101 may be configured to directly obtain the print instruction including print data from the client PC 103 via the external LAN 104. In this case, data analysis processing and rasterization processing, which are performed by the external controller 102, are performed by the image forming apparatus 101. This means that the image forming apparatus 101 and the external controller 102 may be integrally configured.

<System Configuration>

Figure 2:
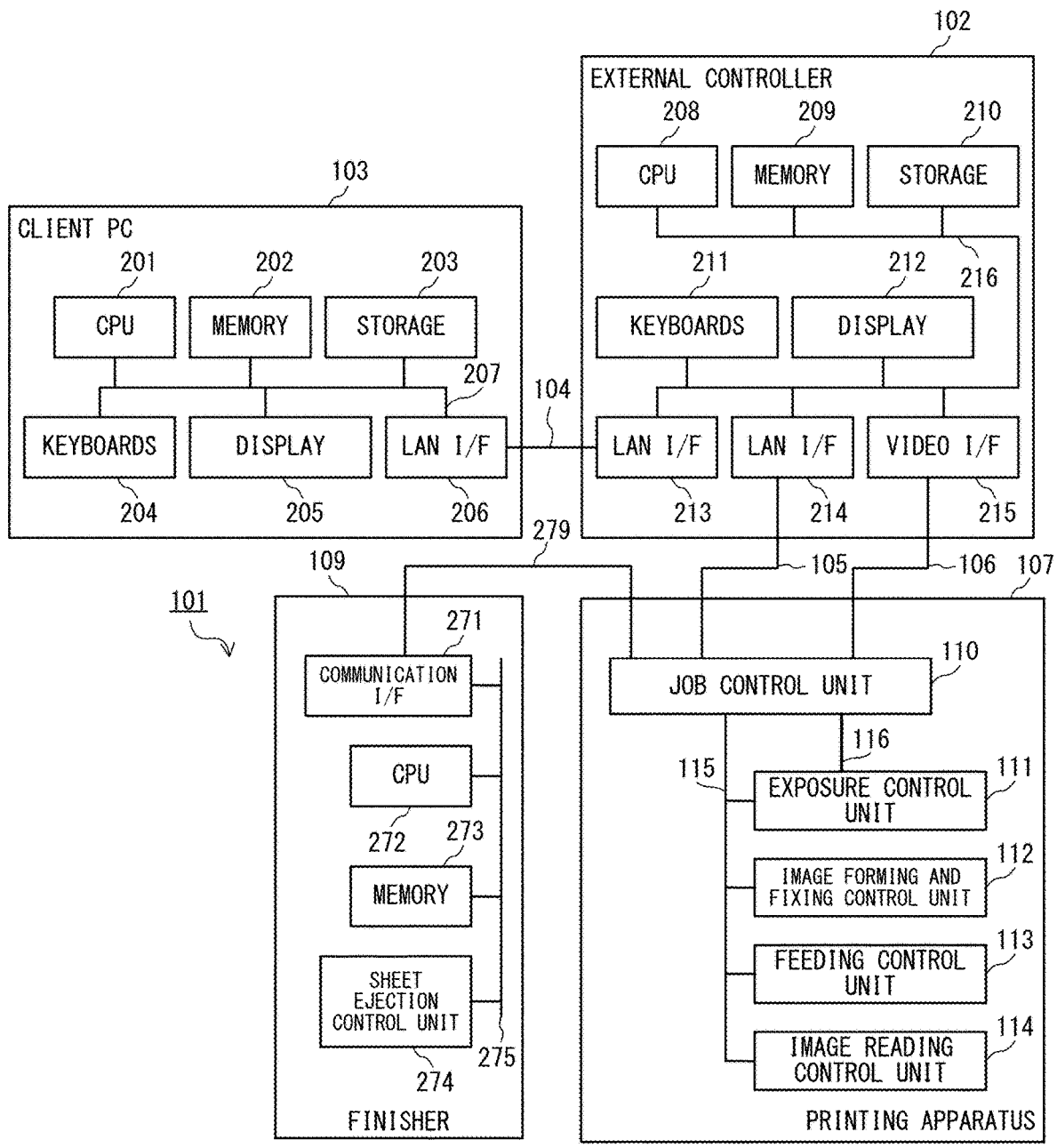
FIG. 2 is a configuration diagram of a system.
Figure 3:
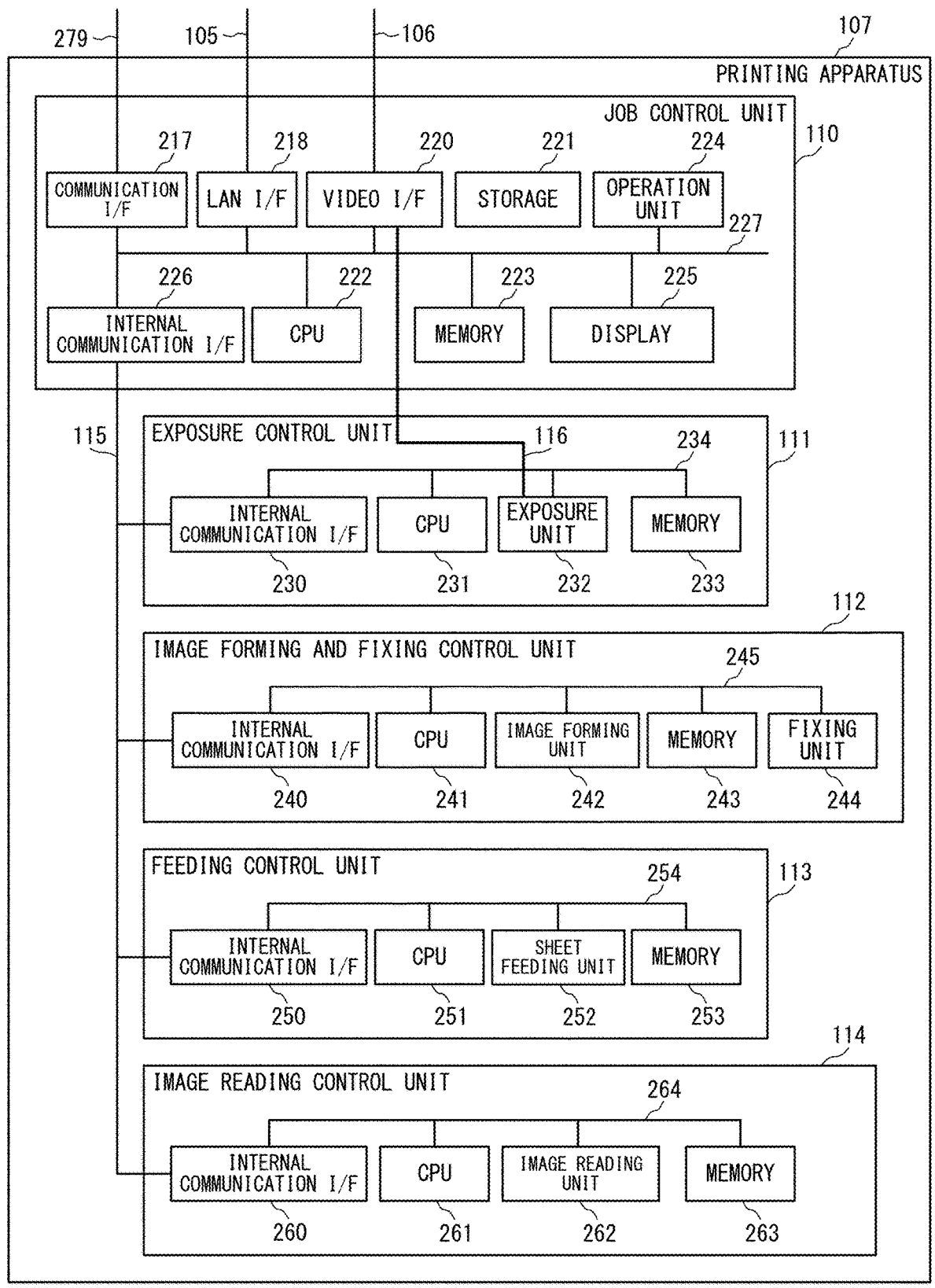
FIG. 3 is a configuration diagram of a system.

FIG. 2 and FIG. 3 are system configuration diagrams for controlling an operation of the image processing system. Here, the controller, which is for controlling the operation of each of the image forming apparatus 101, the external controller 102, and the client PC 103, will be described.

Printing Apparatus

The printing apparatus 107 includes a job control unit 110, an exposure control unit 111, an image forming and fixing control unit 112, the feeding control unit 113, and an image reading control unit 114. The job control unit 110, the exposure control unit 111, the image forming and fixing control unit 112, the feeding control unit 113, and the image reading control unit 114 can communicate with each other via an internal communication line 115. The job control unit 110, the exposure control unit 111, the image forming and fixing control unit 112, the feeding control unit 113, and the image reading control unit 114 perform control for image formation in synchronization with each other. The job control unit 110 and the exposure control unit 111 are connected by an image signal line 116.

In order to communicate with other devices, the job control unit 110 includes a communication interface (I/F) 217, a LAN I/F 218, and a video I/F 220. In order to control an operation of the printing apparatus 107, the job control unit 110 includes a CPU (Central Processing Unit) 222, a memory 223, a storage 221, and an internal communication I/F 226. The job control unit 110 includes an operation unit 224 and a display 225, each for a user interface. These components are communicably connected to each other via a system bus 227.

The communication I/F 217 is connected to the finisher 109 via a communication cable 279 to control communication with the finisher 109. When the printing apparatus 107 cooperates with the finisher 109, information and data are transmitted and received via the communication I/F 217. The LAN I/F 218 is connected to the external controller 102 via the internal LAN 105 to control communication with the external controller 102. The printing apparatus 107 receives print data or the like which represents settings at the time of printing from the external controller 102 via the LAN I/F 218. The video 220 is connected to the external controller 102 via the video cable 106 to control communication with the external controller 102. The printing apparatus 107 receives image data or the like representing an image to be formed from the external controller 102 via the video I/F 220.

The CPU 222 comprehensively controls image processing and printing by executing a computer program stored in the storage 221. The memory 223 provides a work area for the CPU 222 to execute various processes. When performing a printing process, the internal communication I/F controls the communication with the exposure control unit 111, the image forming and fixing control unit 112, the feeding control unit 113, and the image reading control unit 114. The job control unit 110 controls, by the CPU 222, via the internal communication I/F 226, the operations of the exposure control unit 111, the image forming and fixing control unit 112, the feeding control unit 113, and the image reading control unit 114.

The operation unit 224 is an input device which receives input of various settings and operation instructions from the user. The operation unit 224 is, for example, various input keys, a touch panel, or the like. The display 225 is an output device which displays setting information of the image forming apparatus 101, a processing status of the print job, and the like.

the exposure control unit 111 includes an internal communication I/F 230, a CPU 231, an exposure unit 232, and a memory 233. These components are communicably connected to each other via the system bus 234. The CPU 231 communicates with the CPU 222 via the internal communication I/F 230 and controls an operation of the exposure control unit 111 based on instructions of the CPU 222. The memory 233 provides a work area for the CPU 231 to execute various processes.

The exposure unit 232 uniformly charges a surface of the photoconductor and irradiates a laser beam on the surface of the charged photoconductor based on the image data. The exposure unit 232 charges the surface of the photoconductor to a uniform negative potential. The exposure unit 232 obtains image data from the video I/F 220 through the image signal line 116. The exposure unit 232 outputs a laser beam, which has been modulated based on the obtained image data, by using a laser driver and scans the surface of a uniformly charged photoconductor by the laser beam while adjusting a reflection angle of the laser beam with a rotating multifaceted mirror. On the photoconductor, a potential at a position at which the laser beam is irradiated varies to form an electrostatic latent on the surface. Four photoconductors are provided corresponding to the four colors of yellow (Y), magenta (M), cyan (C), and black (K). Electrostatic latent images corresponding to images of different colors are formed on the four photoconductors.

The image forming and fixing control unit 112 includes an internal communication I/F 240, a CPU 241, an image forming unit 242, a memory 243, and a fixing unit 244. These components are communicably connected to each other via the system bus 245. The CPU 241 communicates with the CPU 222 via the internal communication I/F 240, and controls the operation of the image forming and fixing control unit 112 based on the instruction of the CPU 222. The memory 243 provides a work area for the CPU 241 to execute various processes.

The image forming unit 242 transfers the toner image formed on the photoconductor on the sheet. The image forming unit 242 includes a developer, a transfer unit, a toner replenishment unit, and the like. The developer forms the toner image by adhering negatively charged toner, provided from the developing cylinder, to the electrostatic latent image formed on the surface of the photoconductor. Corresponding to the four colors of yellow (Y), magenta (M), cyan (C), and black (K), four developers are provided. The developer visualizes the electrostatic latent image of the photoconductor with the toner of the corresponding color.

An intermediate transfer belt, provided in the transfer unit, transfers the toner image from the photoconductor on the intermediate transfer belt. At a position opposing to the photoconductor, with the intermediate transfer belt in between, a primary transfer roller is provided. By applying a positive potential to the primary transfer roller, from each of the four photoconductors, the toner image is superimposed and transferred on the intermediate transfer belt. As a result, a full-color toner image is formed on the intermediate transfer belt. The toner image formed on the intermediate transfer belt is transferred to the sheet by a secondary transfer roller described later. By applying a positive potential to the secondary transfer roller, the full-color toner image is transferred from the intermediate transfer belt to the sheet.

The fixing unit 244 fixes the transferred toner image on the sheet. The fixing unit 244 heats and pressurizes the toner image on the sheet to melt and fix the same on the sheet. Thereby the image is formed on the sheet.

The feeding control unit 113 includes an internal communication I/F 250, a CPU 251, a sheet feeding unit 252, and a memory 253. These components are communicably connected to each other via the system bus 254. The CPU 251 communicates with the CPU 222 via the internal communication I/F 250 and controls an operation of the feeding control unit 113 based on instructions of the CPU 222. The memory 253 provides a work area for the CPU 251 to execute various processes. To control feeding operations of the sheet, the sheet feeding unit 252 is provided with rollers, such as a feeding roller, and various sensors in its feeding path.

The image reading control unit 114 includes an internal communication I/F 260, a CPU 261, an image reading unit 262, and a memory 263. These components are communicably connected to each other via the system bus 264. The CPU 261 communicates with the CPU 222 via the internal communication I/F 260 and controls the operation of the image reading control unit 114 based on the instructions of the CPU 222. The memory 263 provides a work area for the CPU 261 to execute various processes.

The image reading unit 262 reads the image formed on the conveyed sheet based on an instruction from the CPU 261. When adjusting image forming conditions such as a printing position adjustment (correction of geometric characteristics), image density adjustment, and color misregistration adjustment on a front surface and a back surface of the sheet, the CPU reads, by the image reading unit 262, the adjustment image of the image forming condition formed on the sheet. In the present embodiment, the adjustment image for adjusting the printing position formed on both sides of the sheet is read as an image for adjusting the printing position.

Finisher

A finisher 109 is, for example, a large-capacity stacker. The finisher 109 includes a communication I/F 271, a CPU 272, a memory 273, and a sheet ejection control unit 274. These components are communicably connected to each other via the system bus 275. The communication I/F 271 is connected to the printing apparatus 107 via a communication cable 279 and controls communication with the printing apparatus 107. When the printing apparatus 107 cooperates with the finisher 109, information and data are transmitted and received via the communication I/F 271. The CPU 272 executes a control program stored in the memory 273 and performs various controls necessary for sheet ejection. The memory 273 stores the control program. The memory 273 also provides a work area for the CPU 272 to execute various processes. The sheet ejection control unit 274 conveys the conveyed sheets to the stack tray based on the instruction from the CPU 272.

External Controller

The external controller 102 includes a LAN I/F 213, a LAN I/F 214, and a video I/F 215 in order to communicate with other devices. The external controller 102 includes a CPU 208; a memory 209, and a storage 210 to control the operation of the external controller 102. The external controller 102 includes a keyboard 211 and a display 212, as user interfaces. These components are communicably connected to each other via the system bus 216.

The LAN I/F 213 is connected to the client PC 103 via the external LAN 104 and controls communication with the client PC 103. The external controller 102 obtains a print instruction or the like from the client PC 103 via LAN I/F 213. The LAN I/F 214 is connected to the printing apparatus 107 via the internal LAN 105 and controls communication with the printing apparatus 107. The external controller 102 transmits print data or the like, which represents the settings at the time of printing to the printing apparatus 107 via the LAN I/F 214. The video I/F 215 is connected to the printing apparatus 107 via the video cable 106 to control communication with the printing apparatus 107. The external controller 102 transmits image data or the like to the printing apparatus 107 via the video I/F 215.

By executing the computer program stored in the storage 210, the CPU 208 comprehensively performs processing such as receiving print data obtained from the client PC 103, RIP processing, and transmission of print data to the image forming apparatus 101. The memory 209 provides a work area for the CPU 208 to execute various processes. The keyboard 211 is an input device which receives input of various settings and operation instructions from the user. The display 212 is an output device which displays information, such as an execution application of the external controller 102, as a still image or a moving image.

Client PC

The client PC 103 includes a CPU 201, a memory 202, a storage 203, a keyboard 204, a display 205, and a LAN I/F 206. These components are communicably connected to each other via the system bus 207.

By executing the computer program stored in the storage 203, the CPU 201 controls an operation of the client PC 101. In the present embodiment, the CPU 201 creates print data and transmits print instructions. The memory 202 provides a work area for the CPU 201 to executes various processes. The keyboard 204 and the display 205 are user interfaces. The keyboard 204 is an input device which receives instructions from the user. The display 205 is an output device which displays information, such as an execution application of the client PC 103, as a still image or a moving image. The LAN I/F 206 is connected to the external controller 102 via the external LAN 104 to control communication with the external controller 102. The client PC 103 transmits a print instruction or the like to the external controller 102 by the LAN I/F 206.

The external controller 102 and the image forming apparatus 101 are connected by the internal LAN 105 and the video cable 106. However, other configurations may be used as long as data necessary for printing can be transmitted and received, for example, these devices may be connected only via video cables. Each of the memory 202, the memory 209, the memory 223, the memory 233, the memory 243, the memory 253, the memory 263, and the memory 273 may be a storage device for holding data or programs, respectively. As to these memories, a volatile RAM (Random Access Memory), a non-volatile ROM (Read Only Memory), a storage device, a USB (Universal Serial Bus) memory, and the like may be used.

<Configuration of the Image Forming Apparatus>

FIG. 4 is a configuration diagram of the image forming apparatus 101. A display 225 is provided on the upper part of the printing apparatus 107. The display 225 displays information for the printing status and settings of the image forming apparatus 101. The sheet on which the image is formed by the printing apparatus 107 is conveyed to the finisher 109 provided in the subsequent stage.

The printing apparatus 107 includes, as the sheet feeding unit 252, a plurality of sheet feeding decks 301, 302, and a conveyance path 303. Different types of sheets can be accommodated in each of the sheet feeding decks 301 and 302. As to the sheets accommodated in each of the sheet feeding decks 301 and 302, the topmost sheet is separated and fed to the conveyance path 303. The printing apparatus 107 includes, as the exposure unit 232, the image forming units 304, 305, 306, and 307 for forming an image. The printing apparatus 107 forms a color image. Therefore, the image forming unit 304 forms a black (K) image (the toner image). The image forming unit 305 forms an image of cyan (C) (the toner image). The image forming unit 306 forms a magenta (M) image (the toner image). The image forming unit forms a yellow (Y) image (the toner image).

The printing apparatus 107 includes, as the image forming unit 242, a secondary transfer roller 309, and an intermediate transfer belt 308 on which the toner image is transferred from each of the image forming units 304, 305, 306, and 307. The intermediate transfer belt 308 rotates clockwise in FIG. 3, and the image is transferred on the intermediate transfer belt 308 by the image forming unit 307, the image forming unit 306, the image forming unit 305, and the image forming unit 304 in this order. As a result, a full-color toner image is formed on the intermediate transfer belt 308. The intermediate transfer belt 308 rotates to convey the toner image to the secondary transfer roller 309. The sheet is conveyed toward the secondary transfer roller 309 in synchronization with the timing when the toner image is conveyed to the secondary transfer roller 309. The secondary transfer roller 309 transfers the toner image on the intermediate transfer belt 308 on the conveyed sheet.

The printing apparatus 107 includes, as the fixing unit 244, a first fixing device 311 and a second fixing device 318. The first fixing device 311 and the second fixing device 318 have the same configuration and fix the toner image on the sheet. For this purpose, each of the first fixing device 311 and the second fixing device 318 has a pressure roller and a heat roller. The sheet is heated and pressurized by passing between the pressure roller and the heat roller, thereby the toner image is melted and crimped. The sheet, after processed by the second fixing device 318, is conveyed to the conveyance path 314. The second fixing device 318 is arranged downstream of the first fixing device 311 in a sheet conveyance direction. The second fixing device 318 is used for adding gloss to the image on the sheet which is fixed by the first fixing device 311 and for improving a fixing characteristic. Therefore, the second fixing device 318 may be omitted depending on the type of the sheet and/or content of the printing process. A conveyance path 312 is provided in order to convey the sheet fixed by the first fixing device 311 without passing through the second fixing device 318.

A conveyance path 315 and a reverse path 316 are arranged on the downstream side of a point where the conveyance path 314 and the conveyance path 312 are merged. When double-sided printing is instructed, the sheet is conveyed to the reverse path 316. The sheet conveyed to the reverse path 316, after its conveyance direction is reversed in the reverse path 316, is conveyed to the double-sided conveyance path 317. After passing the reverse path 316 and the double-sided conveyance path 317, a surface of the sheet on which the image is formed (first surface) is reversed. The sheet is conveyed to the conveyance path 303 via the double-sided conveyance path 317, and an image is formed on the second surface, which is a surface opposite to the first surface, by the secondary transfer roller 309 and the fixing unit 244.

In a case of single-sided printing, or in a case where images have been formed on both sides in the double-sided printing, the sheet is conveyed to the conveyance path 315. A conveyance path 323 is arranged on the downstream side of the conveyance path 315 in the sheet conveyance direction.

CISs (Contact Image Sensor) 321 and 322, as the image reading unit 262, are arranged on the conveyance path 323 so as to face each other with the conveyance path 323 in between. FIG. 5 is all explanatory diagram of the CIS 321 and 322. The CIS 321 is an optical sensor which reads an image of an upper surface (second surface) of the sheet which has been double-side printed and conveyed along the conveyance path 323. The CIS 322 is an optical sensor which reads an image of a lower surface (first surface) of the sheet which has been double-side printed and conveyed along the conveyance path 323. The CIS 321 and CIS 322 operate to read an image at the timing when the sheet conveyed along the conveyance path 323 reaches a predetermined position. When the sheet conveyed is the adjustment chart on which the adjustment image has been formed, the CIS 321 and 322 read the adjustment image.

The CIS 321 includes an LED (Light Emitting Diode) 350 as a light source, a reading sensor 351 as a light receiving unit, and a white reference plate 352. The LED 350 irradiates the upper surface of the sheet with light at the timing when the sheet conveyed along the conveyance path 323 reaches a reading position. The reading sensor 351 receives reflected light from the sheet, performs photoelectric conversion of the received reflected light, and transmits the reading result, which is an electric signal, to the CPU 222. The image formed on the sheet is read in this way. The reading sensor 351 includes a plurality of light receiving elements (photoelectric conversion elements) in a direction orthogonal to the sheet conveying direction. Therefore, the direction orthogonal to the sheet conveying direction is a main scanning direction of the CIS 321. The white reference plate 352 is used when calibrating the CIS 321. The white reference plate 352 moves to a position where light is emitted from the LED 350 at the time of calibration and the reflected light is received by the reading sensor 351. CIS 321 is calibrated based on the reading result of the white reference plate 352.

Similar to the CIS 321, the CIS 322 includes an LED 353, a reading sensor 354, and a white reference plate 355. The CIS 322 operates, in the same manner is the CIS 321, to read an image formed on the lower surface of the sheet at the timing when the sheet conveyed along the conveyance path 323 reaches a reading position. The image reading unit 262 may be realized by a CCD sensor or a CMOS sensor as well as by CIS 321 and 322.

In the present embodiment, the adjustment image, for adjusting a position of the image (printing position) formed on both sides of the sheet, is formed. Hereinafter, the sheet on which the adjustment image is formed is referred to as "adjustment chart". The printing apparatus 107 prints the adjustment image on both sides of the sheet to generate the adjustment chart, and reads the adjustment images of both sides by the CIS 321 and the CIS 322. The reading result of the adjustment chart by the CIS 321 and the CIS 322 is stored in the memory 263. The CPU 261 notifies the reading result of the adjustment chart to the job control unit 110. The CPU 222 of the job control unit 110 feeds back the notified reading result to the image forming condition to adjust the printing position. The CPU 222 stores an updated image forming condition in a memory 223, and performs management of the same. The adjustment image may be an image for adjusting image density and/or an image for correcting color misregistration, besides the image for adjustment of the printing position. As for those images, the reading result is processed as in the case of adjusting the printing position.

When a temperature in the printing apparatus 107 rises, the position of the image formed on the sheet changes as compared to that formed on the sheet when the temperature in the printing apparatus 107 is relatively low. In this case, the printing apparatus 107 generates the adjustment chart, obtains a change amount based on the reading result of CIS 321 and 322, and sets the printing position based on the change amount such that the printing position remains the same as compared to the printing position when the temperature in the printing apparatus is relatively low. As a result, the printing apparatus 107 serves to stabilize the printing position accuracy.

Figure 6A:
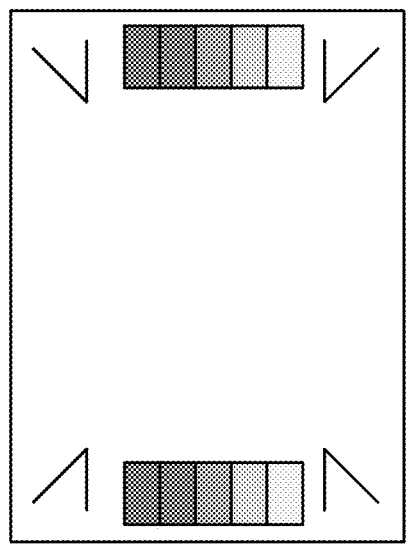
FIG. 6A and FIG. 6B are explanatory diagrams of an adjustment chart.
Figure 6B:
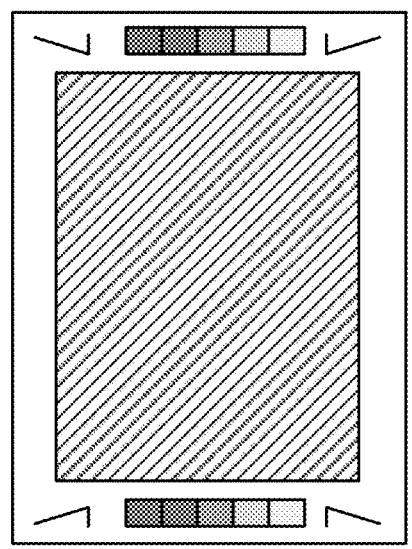

FIG. 6A and FIG. 6B are explanatory diagrams of the adjustment chart. There are two types of the adjustment chart, which are shown in FIG. 6A and FIG. 6B. FIG. 6A represents an adjustment than of a type formed by printing only the adjustment image on the sheet. FIG. 6B represents an adjustment chart of a type in which the adjustment chart is added-on to an image instructed by the print job from the user to thereby form the adjustment image.

The adjustment chart is separated so as not to be mixed in the printed matter corresponding to the print job. In order to achieve the above, the printing apparatus 107 includes a flapper 324, a discharge path 326, a conveyance sensor 327, and a discharge tray 328. The adjustment image on the adjustment chart is read by the CIS 321 and 322, and the adjustment chart is conveyed to the discharge path 326 by the flapper 324. The sheet conveyed to the discharge path 326 is discharged to the discharge tray 328. In a case where the adjustment chart is of a type formed by performing add-on to the image instructed by the print job from the user to thereby form the adjustment image (FIG. 6B), the sheet is not discharged to the discharge tray 328. Rather, the sheet is conveyed from the conveyance path 323 to a downstream conveyance path 325 by a flapper 324.

In a case where the sheet is not the adjustment chart, the sheet is conveyed from the conveyance path 323 to the downstream conveyance path 325 by the flapper 324. The sheet conveyed to the downstream conveyance path 325 is delivered to the finisher 109. In a case where the printing apparatus 107 receives a notification of an occurrence of a conveyance jam from the finisher 109, the printing apparatus 107 switches the flapper 324 to the discharge path 326 side, regardless of whether the sheet is the adjustment chart or not. Thus, all the sheets in the printing apparatus (residual sheet) are discharged to the discharge tray 328. By discharging the residual sheet to the discharge tray 328, the load of jam processing for the user is reduced.

The finisher 109 can carry a large number of sheets discharged from the printing apparatus 107. The finisher 109 includes a conveyance path 331 and a stack tray 332 for stacking sheets. The conveyance sensors 333, 334, 335, 336 are provided in the conveyance path 331. The sheet conveyed from the printing apparatus 107 is stacked on the stack tray 332 via the conveyance path 331. The conveyance sensors 333, 334, 335, 336 detect whether the sheet has passed through the conveyance path 331. In a case where the leading edge or the trailing edge of the sheet in the conveying direction is not detected by the conveyance sensor 333, 334, 335, 336 even after a lapse of a predetermined time from the start of conveying the sheet, the CPU 272 determines that a conveyance jam (conveyance failure) has occurred in the finisher 109. In this case, the CPU 272 notifies the printing apparatus 107 that the conveyance jam has occurred. Thus, the finisher 109 detects a sheet conveyance abnormality at the downstream side of the CISs 321 and 322 in the sheet conveyance direction.

<Adjustment Mode>

An adjustment mode for adjusting the image forming condition includes an adjustment chart insert mode in which only the adjustment image is printed in one sheet and a real time adjustment mode. In the adjustment than insert mode, the adjustment chart is generated every time the number of printed sheets reaches a predetermined number. That is, the print position is adjusted every time the predetermined number of sheets are printed. The predetermined number of sheets can be set by the user. A print position adjustment interval (an image forming condition adjustment interval) is set by setting the predetermined number of sheets. In the real-time adjustment mode, the adjustment chart is generated by printing the image instructed by the print job and the adjustment image added on one sheet.

FIG. 7A to FIG. 7E are explanatory diagrams of an adjustment mode setting screen. The setting screen is displayed on the display 225 by the CPU 222. The user sets the adjustment mode in the setting screen using the operation unit 224.

Figure 7A:
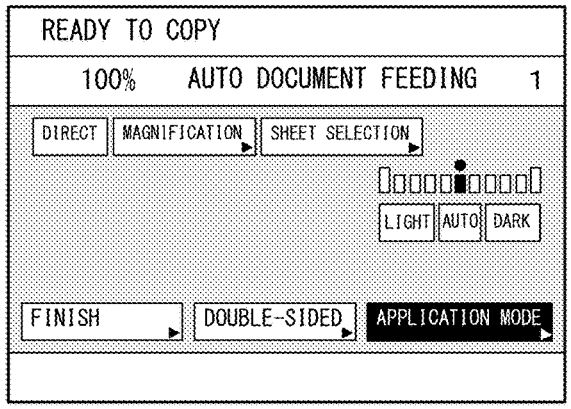
FIG. 7A to FIG. 7E are explanatory diagrams of a setting screen of the adjustment mode.
Figure 7B:
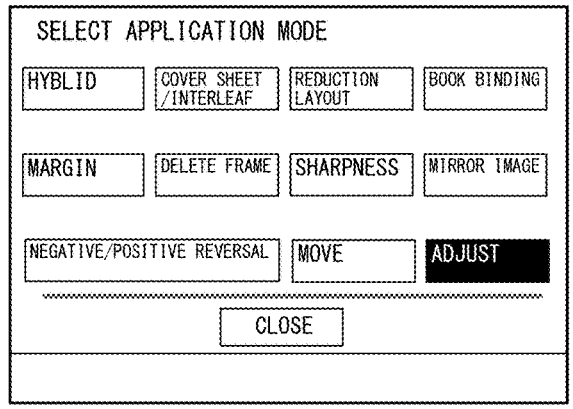

FIG. 7A is an initial screen. When the user selects a soft key "APPLICATION MODE" in the initial screen, the CPU 222 displays an application mode selection screen, shown in FIG. 7B, on the display 225. When the user selects a soft key "ADJUST" in the application mode selection screen, the CPU 222 displays the adjustment mode selection screen, shown in FIG. 7C, on the display 225. When the user selects a soft key "CLOSE" in the application mode selection screen, the CPU 222 displays the initial screen on the display 225.

When setting the adjustment chart insertion mode, the user selects a soft key "PREDETERMINED INTERVAL" from the adjustment mode selection screen. As a result, the CPU 222 displays an adjustment interval setting screen of FIG. 7D on the display 225. When the user selects the soft key "BACK" from the adjustment mode selection screen, the CPU 222 displays an application mode select on screen on the display 225.

When the user selects a soft key "DECIDE" after setting the number of insertion intervals with the numeric keypad in the adjustment interval setting screen, the CPU 222 sets the number of insertion intervals of the adjustment chart. When "DECIDE" is selected, the CPU 222 stores the number of insertion intervals input via the adjustment interval setting screen in the memory 223. When the user selects the soft key "BACK" in the adjustment interval setting screen, the CPU 222 displays the adjustment mode selection screen on the display 225.

The CPU 222 notifies the external controller 102 of the number of insertion intervals stored in the memory 223. The external controller 102 stores the notified number of insertion intervals in the memory 209. The external controller 102, after the number of insertion intervals of sheets have been printed, instructs the printing apparatus 107 to generate the adjustment chart. For example, in a case where "200", i.e., the number of the sheets, is input and the soft key "DECIDE" is selected in the adjustment interval setting screen, the printing apparatus 107 is instructed to print the adjustment chart from the external controller 102 every time 200 sheets are printed. In a case where the print job instructs to print 1000 sheets, the printing apparatus 107 generates the adjustment chart between pages 200 and 201, between pages 400 and 401, between pages 600 and 601, and between pages 800 and 801.

Figure 7C:
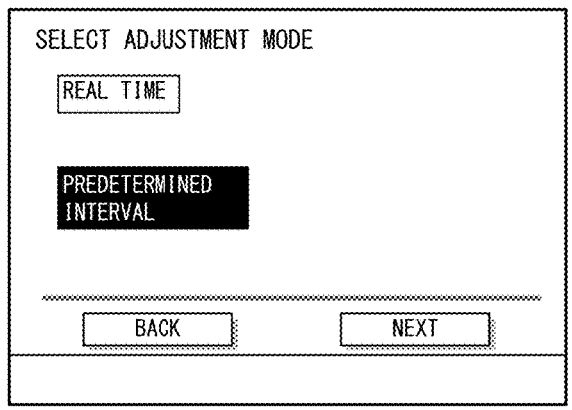
Figure 7D:
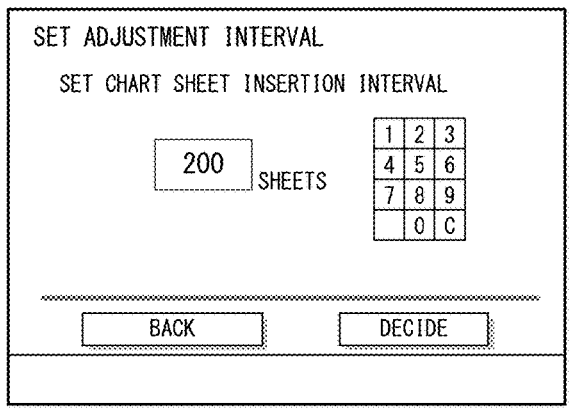
Figure 7E:
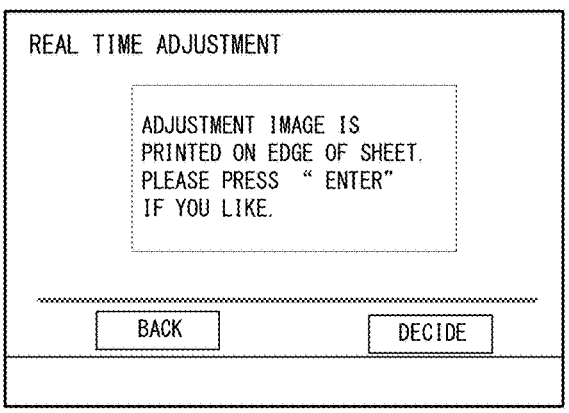

When setting a real time adjustment mode, the user selects a soft key "REALTIME" on the adjustment mode selection screen (FIG. 7C). As a result, the CPU 222 displays a real time adjustment screen of FIG. 7E on the display 225. When the soft key "DECIDE" is selected on the real time adjustment screen, the CPU 222 sets the real time adjustment mode. By setting the real time adjustment mode in the adjustment mode, when a print job is notified from the external controller 102, the CPU 222 prints the adjustment image by adding-on the same to the image of the printing job. In the real time adjustment mode, since the adjustment image is formed on all sheets, the adjustment interval is not set.

The adjustment mode is set as described above. Although the above example is directed to a configuration in which adjustment mode is set by the printing apparatus 107, the adjustment mode may be set by the external controller 102 or the client PC 103. When the external controller 102 is used, each setting screen shown in FIG. 7A to FIG. 7E is displayed on the display 212. The adjustment mode which is set in the above is notified to the printing apparatus 107 from the external controller 102. When using the client PC 103, each setting screen shown in FIG. 7A to FIG. 7E is displayed on the display 205. The adjustment mode which is set in the above is notified to the printing apparatus 107 from the client PC 103 via the external controller 102.

<Printing Process>

In the present embodiment, the image forming condition is adjusted based on a reading result (hereinafter, referred to as "reading data") of the adjustment image obtained by the CPU 222 of the job control unit 110 from the image reading control unit 114. Two or more image forming conditions are prepared. The CPU 222 assigns an image forming condition ID as an identifier to each of the image forming conditions in order to identify each image forming condition. The CPU 222 determines the image forming conditions which are used when printing the image of each page, and notifies each control unit of the determined image forming condition ID and image parameters of the image forming conditions.

The exposure control unit 111, the image forming and fixing control unit 112, the feeding control unit 113, and the image reading control unit 114 store the image parameters of the image forming condition and the image forming condition ID received from the job control unit 110 in the respective memories 233, 243, 253, 263. The exposure control unit 111, the image forming and fixing control unit 112, the feeding control unit 113, and the image reading control unit 114 perform the printing process with reference to the image forming condition. The image forming condition is stored based on the image forming condition ID included in the page information, which is notified when the image of each page is printed and is described later.

FIG. 8A to FIG. 8D are explanatory diagrams of various information used in the printing process. FIG. 8A is an explanatory diagram of information (page information) related to image formation, by the printing apparatus 107, of one page. The page information is generated page by page based on the print data. The page information is identified by the page ID. The page information includes a size of the sheet used for printing, basis weight, a sheet type (paper type), a sheet feeding deck ID, adjustment chart information, all image forming condition ID, and the like. The size of the sheet is a length (paper width) in a direction orthogonal to the sheet conveying direction (main scanning direction) and a length (paper length) in a sheet conveyance direction (sub-scanning direction). The sheet feeding deck ID indicates a sheet feeding deck which is a feeding source of the sheet. The adjustment chart information indicates whether or not the page is the adjustment chart. The image forming condition ID identifies the image forming condition at the time of printing. The CPU 222 controls printing on the sheet based on the page information.

FIG. 8B is an explanatory diagram of the image forming condition. The image forming condition ID is assigned to the image forming condition and one or more image parameters are included in the image forming condition. Further, the image forming condition is transmitted in a form of a packet. The image forming condition is associated with the sheet feeding deck or the type of the sheet (paper type) and is stored in the memory 233.

FIG. 8C is an explanatory diagram of the image forming condition associated with the sheet feeding deck. The image forming condition is associated with the sheet feeding deck which is the feeding source of the sheet of the adjustment chart used for adjusting the image forming condition. In the example of FIG. 8C, the "the image forming condition packet 11" and the "the image forming condition packet 12" are associated with the sheet feeding deck 301 (the first sheet feeding deck). Further, "image forming condition packet 21" and the "image forming condition packet 22" are associated with the sheet feeding deck 302 (the second sheet feeding deck). That is, when printing on the sheet fed from the sheet feeding deck 301, one of the image forming condition packet 11, the image forming condition packet 12, and the like is set in the image forming condition. When printing on the sheet fed from the sheet feeding deck 302, one of the image forming condition packet 21, the image forming condition packet 22, and the like is set in the image forming condition. A transmission flag indicates whether or not the image forming condition packet has been transmitted to each control unit.

FIG. 8D is an explanatory diagram of the image forming condition associated with the paper type. The image forming condition is associated with the type of sheet of the adjustment chart used for adjusting the image forming condition. In the example of FIG. 8D, "image forming condition packet A1" and "image forming condition packet A2" are associated with the paper type A. Further, "image forming condition packet B1" and "image forming condition packet B2" are associated with the paper type B. That is, when printing on a sheet of the paper type A, one of the image forming condition packet A1, the image forming condition packet A2, and the like is set in the image forming condition. When printing on a sheet of the paper type B, one of the image forming condition packet B1, the image forming condition packet B2, and the like is set in the image forming condition. The transmission flag indicates whether or not the image forming condition packet has been transmitted to each control unit.

Figure 9:
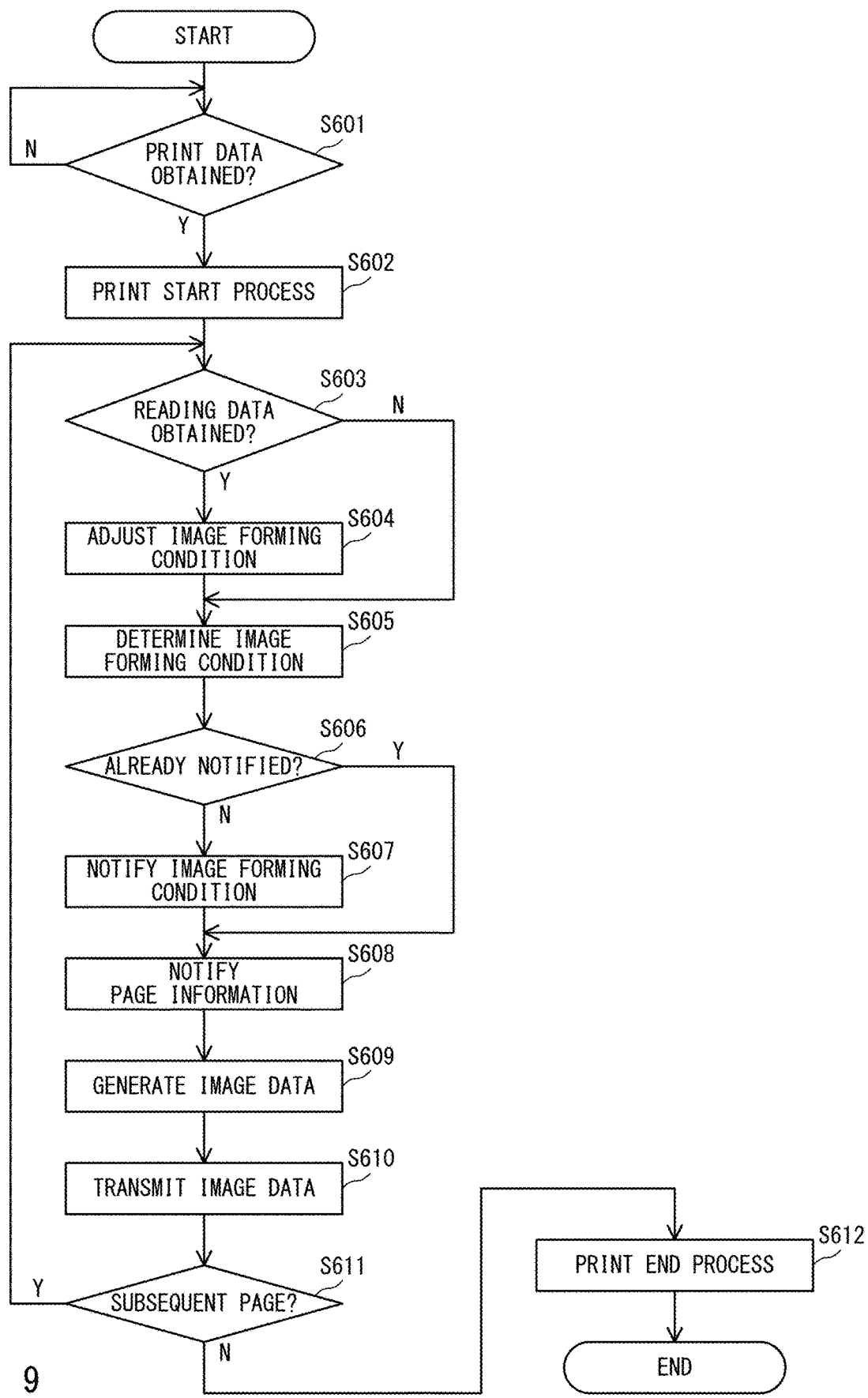
FIG. 9 is a flowchart illustrating a printing process.

FIG. 9 is a flowchart representing the printing process.

The CPU 222 waits until the print data is obtained from the external controller 102 (Step S601: N). After obtaining the print data from the external controller 102 (Step S601: Y), the CPU 222 performs a print start process (Step S602). The CPU 222 notifies, by the print start process, the exposure control unit 111, the image forming and fixing control unit 112, the feeding control unit 113, and the image reading control unit 114 of a start of printing.

The CPU 222 determines whether or not the reading data, which is a reading result of the adjustment image, has been obtained from the image reading control unit 114 (Step S603). When the reading data of the adjustment image is obtained (Step S603: Y), the CPU 222 adjusts the image forming condition to store the same in the memory 223 based on the obtained read data (Step S604). The image forming condition is given to the image forming condition ID, and is stored in the memory 223 as an image forming condition packet. The transmission flag (FIG. 8C, FIG. 8D) is set to OFF when the image forming condition is adjusted.

When the reading data of the adjustment image has not been obtained (Step S603: N), or after adjusting the image forming condition, the CPU 222 determines the image forming condition to be used when printing the image on the sheet (Step S605). The CPU 222 determines the image forming condition, with reference to the information in FIG. 8C and FIG. 8D, based on the sheet feeding deck and the paper type instructed by the print data.

The CPU 222 determines whether or not the determined image forming condition has been already notified to the exposure control unit 111, the image forming and fixing control unit 112, the feeding control unit 113, and the image reading control unit 114 (Step S606). The CPU 222 determines whether or not the image forming condition has been notified based on the transmission flag. If the transmission flag is ON, it indicates the image forming condition has been notified, and if it is OFF, it indicates that the image forming condition has not been notified.

When the image forming condition has not been notified (Step S606: N), the CPU 222 notifies the determined the image forming condition to the exposure control unit 111, the image forming and fixing control unit 112, the feeding control unit 113, and the image reading control unit 114 (Step S607). After notifying, the CPU 222 sets the transmission flag to ON. The image forming condition is notified as the image forming condition packet including the image forming condition ID, as shown in FIG. 8B.

After notifying the image forming condition, the CPU 222 generates page information according to the print data, and notifies the exposure control unit 111, the image forming and fixing control unit 112, the feeding control unit 113, and the image reading control unit 114 (Step S608). When the image forming condition has already been notified (Step S606: Y), the CPU 222 notifies each control unit of the page information without notifying the image forming condition. As shown in FIG. 8A, the page information includes the image forming condition ID. The CPU 222 determines the image forming condition packet (the image forming condition ID) based on, for example, "sheet feeding deck ID" or "paper type" of the print data (page information) and the information shown in FIG. 8C and FIG. 8D. The CPU 222 generates page information including the determined image forming condition ID. In a case where the adjustment image is not printed and it is not necessary to read the adjustment image by the image reading control unit 114, the CPU 222 does not notify the image reading control unit 114 of the page information.

The CPU 222 generates image data from the print data based on the image forming condition (Step S609). When the adjustment mode has been set to the real time adjustment mode, the CPU 222 generates image data in which the adjustment image is added on the image instructed by the print job notified from the external controller 102. The CPU 222 transmits the generated image data to the exposure control unit 111 and the image forming and fixing control unit 112 (Step S610).

The CPU 222 which has transmitted the image data determines whether or not the print data has a subsequent page (Step S611). When there is the subsequent page (Step S611: Y), the CPU 222 repeats the processes Steps S603 to S611 until there is no subsequent page. When there is no subsequent page (Step S611: N), the CPU 222 performs a print end process (Step S612). The CPU 222 notifies, by the print end process, the exposure control unit 111, the image forming and fixing control unit 112, the feeding control unit 113, and the image reading control unit 114 that the printing process is ended. The printing process is performed as described above.

Figure 10:
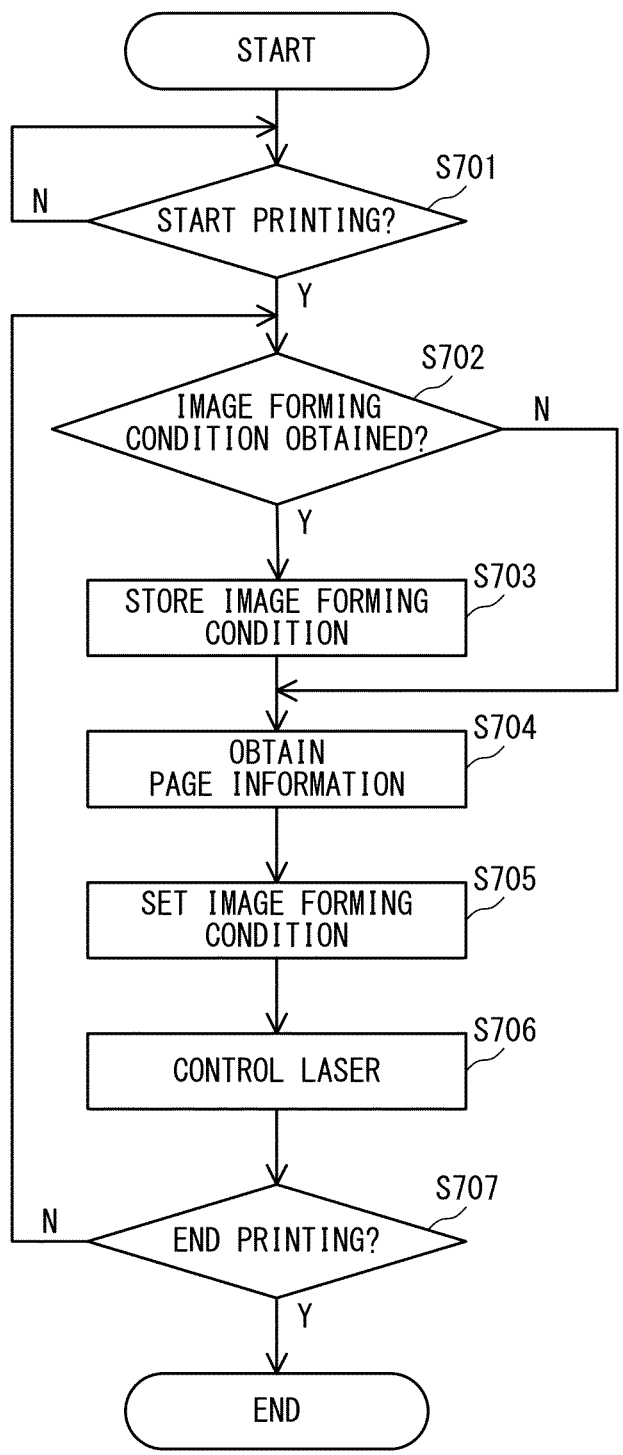
FIG. 10 is a flowchart representing a process performed by an exposure control unit when performing a printing process.

FIG. 10 is a flowchart representing the processes of the exposure control unit 111 at the time of performing the printing process.

The CPU 231 of the exposure control unit 111 waits until the job control unit 110 notifies the start of printing (Step S701: N). When the start of printing (Step S701: Y) is notified from the job control unit 110, the CPU 231 determines whether or not the image forming condition, which is notified from the job control unit 110 in Step S607, has been obtained or not (Step S702). In a case where the image forming condition has been obtained (Step S702: Y), the CPU 231 stores the obtained image forming condition in the memory 233 together with the image forming condition ID (Step S703).

In a case where the image forming condition has not been obtained (Step S702: N), or after storing the obtained image forming condition, the CPU 231 obtains the page information notified from the job control unit 110 (Step S704). The CPU 231 selects and sets the image forming condition from the memory 233 based on the image forming condition ID included in the obtained page information (Step S705). For example, the CPU 231 sets a section or an area to be irradiated by the laser beam in the exposure unit 232 based on the selected image forming condition. The CPU 231 controls an output power of the laser beam by the exposure unit 232 based on the image data obtained from the job control unit 110 (Step S706).

The CPU 231 determines whether or not the print end has been notified from the job control unit 110 (Step S707). In a case where the print end has not been notified (Step S707: N), the CPU 231 repeats the processes Steps S702 to S707 until the print end is notified. When the print end has been notified (Step S707: Y), the CPU 231 ends the process. After ending the process, the CPU 231 enters a standby state for the start of printing which is notified from the job control unit 110.

Figure 11:
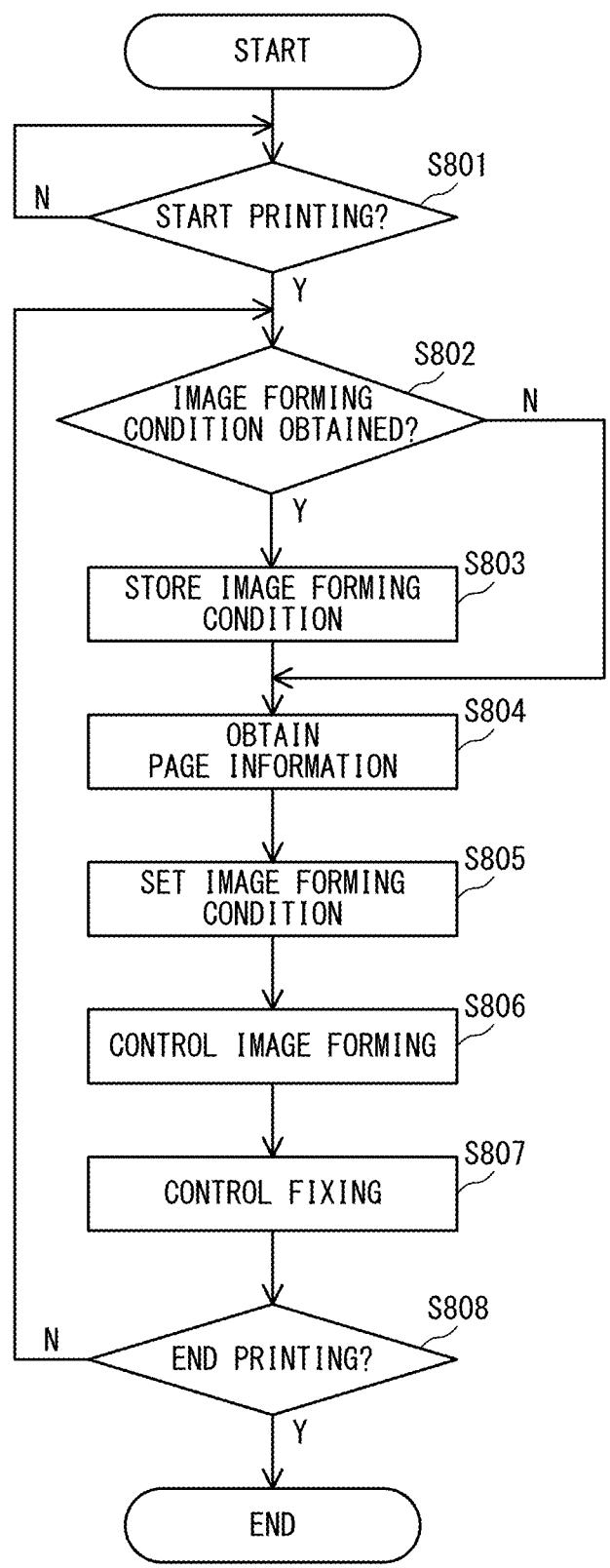
FIG. 11 is a flowchart representing a process performed by an image forming and fixing control unit when performing a printing process.

FIG. 11 is a flowchart representing the processes of the image forming and fixing control unit 112 at the time of the printing process.

The CPU 241 of the image forming and fixing control unit 112 waits until the job control unit 110 notifies the start of printing (Step S801: N). In a case where the start of printing is notified from the job control unit 110 (Step S801: Y), the CPU 241 determines whether or not the image forming condition, which is notified from the job control unit 110 in Step S607, has been obtained or not (Step S802). In a case where the image forming condition has been obtained (Step S802: Y), the CPU 241 stores the obtained image forming condition in the memory 243 together with the image forming condition ID (Step S803).

In a case where the image forming condition has not been obtained (Step S802: N), or after storing the obtained image forming condition, the CPU 241 obtains the page information notified from the job control unit 110 (Step S804). The CPU 241 selects and sets the image forming condition from the memory 243 based on the image forming condition ID included in the obtained page information (Step S805). For example, the CPU 241 sets, in the image forming unit 242, an amount of toner when developing the electrostatic latent image with toner, a transfer intensity when transferring the toner image on the sheet, and the like, based on the selected image forming conditions. The CPU 241 controls the image forming process by the image forming unit 242 based on the image data obtained from the job control unit 110 (Step S806). The CPU 241 controls a fixing process performed by the fixing unit 244 (Step S807).

The CPU 241 determines whether or not the print end has been notified from the job control unit 110 (Step S808). In a case where the print end has not been notified (Step S808: N), the CPU 241 repeats the processes Steps S802 to S808 until the print end is notified. When the print end has been notified (Step S808: Y), the CPU 241 ends the process. After ending the process, the CPU 241 enters a standby state for the start of printing which is notified from the job control unit 110.

Figure 12:
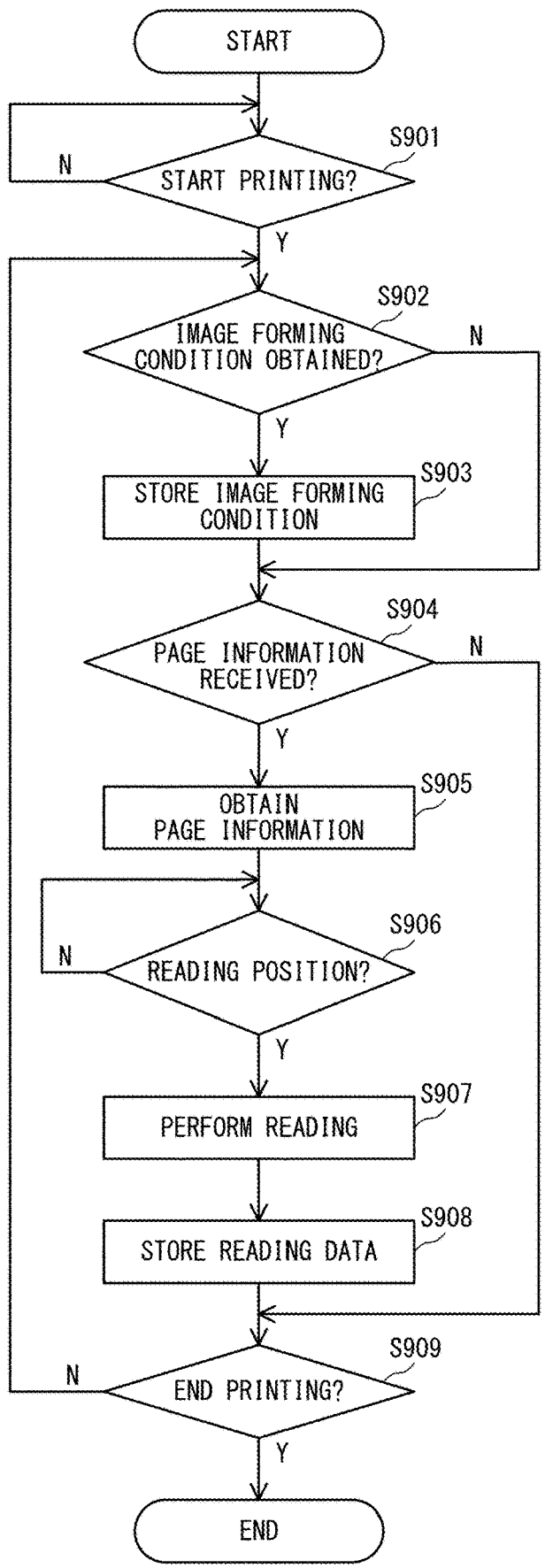
FIG. 12 is a flowchart representing a process performed by an image reading control unit when performing a printing process.

FIG. 12 is a flowchart representing the processes of the image reading control unit 114 at the time of performing the printing process.

The CPU 261 of the image reading control 114 waits until the job control unit 110 notifies the start of printing (Step S901: N). In a case where the start of printing is notified from the job control unit 110 (Step S901: Y), the CPU 261 determines whether or not the image forming condition, which is notified from the job control unit 110 in Step S607, has been obtained or not (Step S902). In a case where the image forming condition has been obtained (Step S902: Y), the CPU 261 stores the obtained image forming condition in the memory 263 together with the image forming condition ID (Step S903).

In a case where the image forming condition has not been obtained (Step S902: N), or after storing the obtained image forming condition, the CPU 261 determines whether or not the page information has been received from the job control unit 110 (Step S904). As described above, the page information is not notified when it is not necessary to read the adjustment image by the image reading control unit 114.

When receiving page information (Step S904: Y), the CPU 261 obtains the page information (Step S905). Then, the CPU 261 waits until the adjustment chart reaches the reading position of the image reading unit 262 (Step S906: N). To determine whether or not the adjustment chart has reached the reading position, a sensor is provided, for example, to detect a sheet on the upstream side of the CIS 322 in the sheet transport direction. Based on a detection result of the sensor, it is determined whether or not the seat has reached the reading position.

When the adjustment chart reaches the reading position (Step S906: the CPU 261 executes the reading operation of the adjustment chart by the image reading unit 262 (Step S907). The CPU 261 stores the reading data, which is the reading result of the adjustment chart, in the memory 263, and transmits the reading data to the job control unit 110 (Step S908). The job control unit 110 adjusts the image forming condition based on the reading data.

After storing and notifying the reading data, the CPU 261 determines whether or not the print end has been notified from the job control unit 110 (Step S909). When not receiving the page information, (Step S904: N), the CPU 261 does not perform the processes of Steps S905 to S908 and determines whether the print end has been notified or not. In a case where the print end has not been notified (Step S909: N), the CPU 261 repeats the processes of Steps S902 to S909 until the print end is notified. When the print end has been notified (Step S909: Y), the CPU 261 ends the process. After ending the process, the CPU 261 enters a standby state for the start of printing which is notified from the job control unit 110.

Figure 13A:
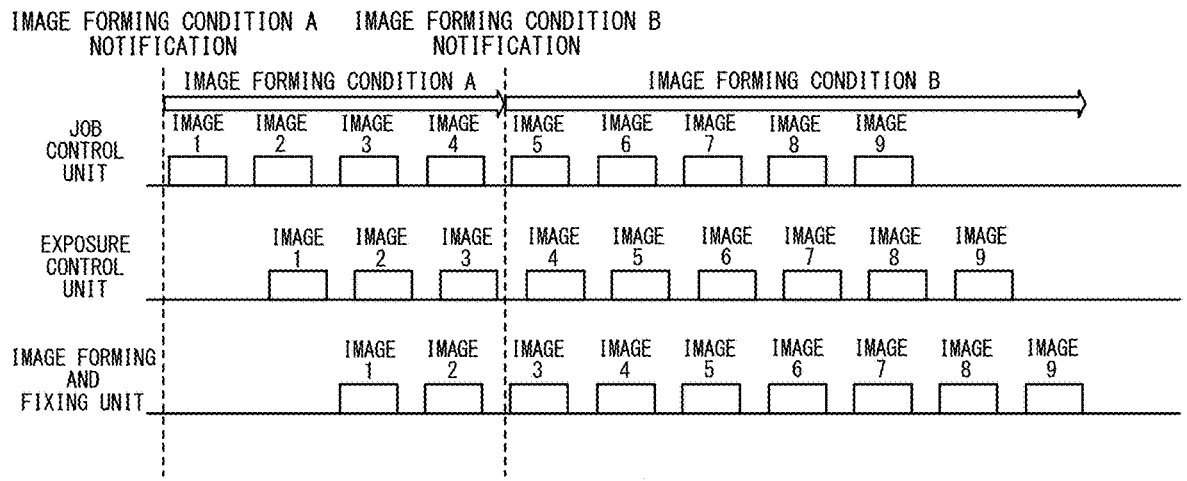
FIG. 13A to FIG. 13C are explanatory diagrams representing the effects of the present embodiment.
Figure 13B:
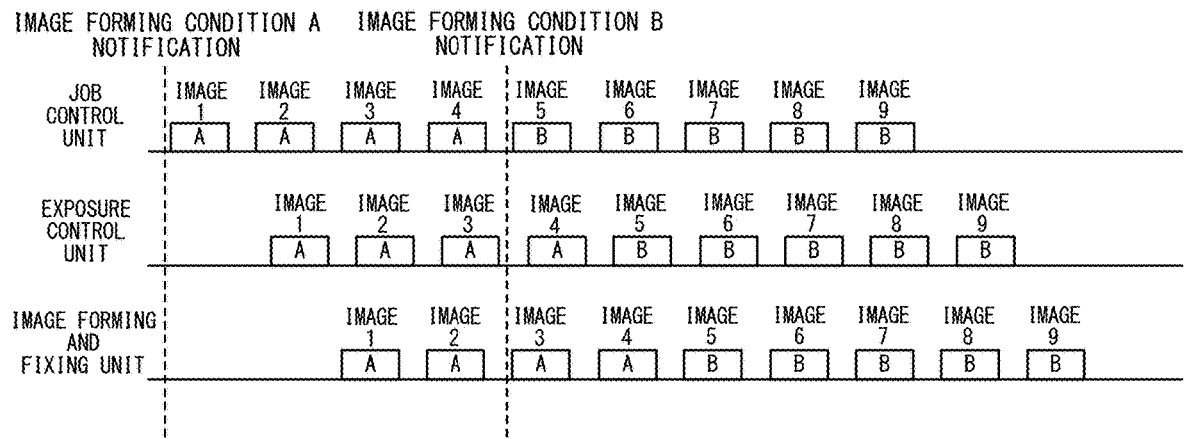
Figure 13C:
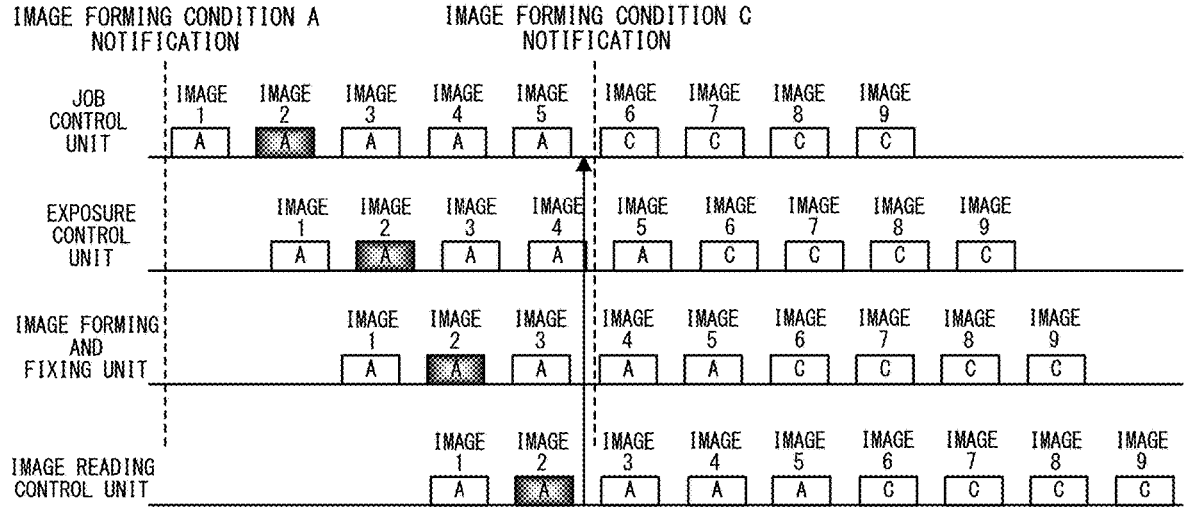

Due to the above processes, the image forming apparatus 101 can print the images on the same page with the same image forming condition even when the image forming conditions are switched while continuously printing on multiple pages. FIG. 13A to FIG. 13C are explanatory diagrams of the effect of this embodiment.

FIG. 13A is a timing chart at the time of switching the image forming condition in a comparative example. In FIG. 13A, the image forming condition is switched from an image forming condition A to an image forming condition B at the timing between the fourth image (page) and the fifth image (page) in the job control unit 110. This timing corresponds to a timing between the third image and the fourth image in the exposure control unit 111. Further, this timing corresponds to a timing between the second image and the third image in the image forming and fixing control unit 112. Therefore, though the third image and the fourth image are images on the same page, the printing process is performed by different image forming conditions in each control unit.

FIG. 13B is a timing chart at the time of switching the image forming condition in the real time adjustment mode. When the job control unit 110 processes the fifth image, the image forming conditions of other control units are switched according to the page information. Therefore, the first to fourth images are printed in the image forming condition A, and the fifth image and the subsequent images are printed in the image forming condition B.

FIG. 13C is a timing chart at the time of switching the image forming condition in a case where the adjustment chart insertion mode is performed. The second image in FIG. 13C is the adjustment image. The image forming condition C is determined based on the reading result of the adjustment image by the image reading unit 262. The sixth and subsequent images are printed in the image forming condition C.

As described above, in the present embodiment, the images on the same page are printed by the same image forming conditions to prevent the images on the same page from being printed in the different image forming conditions. Therefore, the image quality of the images printed on the same page is maintained. Therefore, the quality of the printed matter is prevented from being decreased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-086455, filed May 18, 2020, which is hereby incorporated by reference herein in its entirety.

What is claimed is:

1. An image forming apparatus comprising:
   an image forming unit configured to perform a first image forming process and a second image forming process to form an image and a test image on a sheet;
   a reader, arranged in a conveyance path along which the sheet is conveyed, configured to read a test image on the sheet, the test image being formed by the image forming unit;
   a memory;
   a controller configured to:
      obtain, from the reader, reading data related to the test image on the sheet;
      generate, the reading data, an image forming condition for the first image forming process and an image forming condition for the second image forming process; and
      store the image forming condition for the first image forming process and the image forming condition for the second image forming process,
   wherein the controller generates a third image forming condition for the first image forming process and a fourth image forming condition for the second image forming process based on reading data related to test image formed by performing the first image forming process based on the first image forming condition and the second image forming process based on the second image forming condition,
   wherein, in a case where the image forming unit performs the first image forming process based on a first image forming condition to form a N-th image on a N-th sheet, the image forming unit performs the second image forming process based on a second image forming condition even if a third image forming condition for the first image forming process and a fourth image forming condition for the second image forming process are stored in the memory
   wherein, in a case where a (N+1)-th image is formed on a (N+1)-th sheet, the image forming unit performs the first image forming process based on the third image forming condition and the second image forming process based on the fourth image forming condition.

2. The image forming apparatus according to claim 1, wherein the memory includes a first memory in which the image forming condition for the first image forming process is stored and a second memory in which the image forming condition for the second image forming process is stored.

3. The image forming apparatus according to claim 1, wherein the controller outputs identification information, wherein the memory stores a plurality of image forming conditions for the first image forming process and a plurality of image forming conditions for the second image forming unit,
   wherein the image forming unit is configured to select, based on the identification information, the image forming condition for the first image forming process, for each of the plurality of sheets, among the plurality of image forming conditions for the first image forming process in the memory, and
   wherein the image forming unit is configured to select, based on the identification information, the image forming condition for the second image forming process, for each of the plurality of sheets, among the plurality of image forming conditions for the second image forming process in the memory.

4. The image forming apparatus according to claim 1, wherein the image forming unit includes a photoconductor, an exposure unit configured to expose the photoconductor to form an electrostatic latent image, a development unit configured to develop the electrostatic latent image formed of the photoconductor, a transfer unit configured to transfer the image developed by the development unit on the sheet, and a fixing unit to fix the image on the sheet,
   wherein the first image forming process corresponds to a process of exposing, by the exposure unit, the photoconductor, and
   wherein the second image forming process corresponds to a process of transferring, by the transfer unit, the image on the sheet.

5. The image forming apparatus according to claim 1, wherein the controller is configured to generate, to adjust density of the image formed on the sheet, the image forming condition for the first image forming process and the image forming condition for the second image forming process based on the reading data.

6. The image forming apparatus according to claim 1, wherein the controller is configured to generate, to correct geometric characteristics of an image to be formed on a sheet, the image forming condition for the first image forming process and the image forming condition for the second image forming process based on the reading data.

* * * * *